US009856024B2

(12) United States Patent
Burd

(10) Patent No.: US 9,856,024 B2
(45) Date of Patent: Jan. 2, 2018

(54) COMPACT AIRCRAFT CABIN ATTENDANT SEAT

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

(*) Notice: Subject to any disclaimer, the term of this patent is extended or adjusted under 35 U.S.C. 154(b) by 0 days.

(21) Appl. No.: 14/301,598

(22) Filed: Jun. 11, 2014

(65) Prior Publication Data

US 2014/0368012 A1 Dec. 18, 2014

Related U.S. Application Data

(60) Provisional application No. 61/836,304, filed on Jun. 18, 2013.

(51) Int. Cl.
*A47C 9/06* (2006.01)
*B64D 11/06* (2006.01)
(Continued)

(52) U.S. Cl.
CPC ............... *B64D 11/06* (2013.01); *A47C 9/06* (2013.01); *B60R 22/00* (2013.01);
(Continued)

(58) Field of Classification Search
CPC ...... A47C 9/06; B64D 11/06; B64D 11/0691; B64D 25/04; B64D 11/0649; B60R 22/00; Y02T 50/46
(Continued)

(56) References Cited

U.S. PATENT DOCUMENTS 1,199,002 A * 9/1916 Freise .............. A47C 9/06
297/14
1,412,367 A * 4/1922 Noack ............. A47B 5/04
297/14
(Continued)

FOREIGN PATENT DOCUMENTS

FR 2980457 A1 3/2013
JP 61-500486 A 3/1986
(Continued)

OTHER PUBLICATIONS

International Search Report, Sep. 24, 2014, 5 pages, from PCT/US2014/042317, published as WO2014/204804 Dec. 24, 2014.
(Continued)

*Primary Examiner* — Timothy J Brindley
(74) *Attorney, Agent, or Firm* — Donna P. Suchy

(57) ABSTRACT

A compact aircraft cabin crew attendant seat includes a seat back portion, a shell that encloses the seat back portion, a head rest portion mounted to a top portion of the seat back portion, and a seat portion or squab. The seat portion includes a hinge that is slidably attached within a vertical slot in the shell, allowing the seat portion to be folded down in an open position of the crew attendant seat for use. The seat portion hinge moves vertically between an upper position in the compact closed position and a lower position in the open position. A major portion of the crew attendant seat is formed from high strength carbon fiber reinforced composite to reduces weight. A vertical shock absorption system is configured to absorb energy during a crash landing.

20 Claims, 4 Drawing Sheets

(51) Int. Cl.
*B60R 22/00* (2006.01)
*B64D 25/04* (2006.01)

(52) U.S. Cl.
CPC ...... *B64D 11/0649* (2014.12); *B64D 11/0691* (2014.12); *B64D 25/04* (2013.01); *Y02T 50/46* (2013.01)

(58) Field of Classification Search
USPC .......................................................... 297/14
See application file for complete search history.

(56) References Cited

U.S. PATENT DOCUMENTS

| | | | | |
|---|---|---|---|---|
| 1,692,930 A * | 11/1928 | Cummings | ............... | A47B 5/04 108/38 |
| 1,761,673 A * | 6/1930 | Lauris | ....................... | A47C 9/06 297/14 |
| 1,784,390 A * | 12/1930 | Rice | ........................ | A47C 9/06 297/14 |
| 3,594,037 A * | 7/1971 | Sherman | ................ | A47C 1/036 297/14 |
| 4,460,215 A | 7/1984 | Chamberlain et al. | | |
| 4,487,383 A | 12/1984 | Mazelsky | | |
| 4,580,832 A * | 4/1986 | Maruyama | ............... | A47C 9/06 297/14 |
| 4,902,069 A | 2/1990 | Lehnert | | |
| 4,993,666 A * | 2/1991 | Baymak | ................... | B09B 1/00 244/122 R |
| 5,344,210 A * | 9/1994 | Marwan | ................... | F16F 7/123 297/216.2 |
| 5,558,301 A * | 9/1996 | Kerdoncuff | .......... | B60N 2/4242 244/118.6 |
| 5,564,780 A * | 10/1996 | Presser | ................. | B60N 2/2878 297/238 |
| 6,089,651 A * | 7/2000 | Carmen | .................. | A47C 1/126 248/501 |
| 6,896,322 B1 * | 5/2005 | Foy | ........................ | A47C 1/126 297/129 |
| 8,087,612 B2 * | 1/2012 | Park | ....................... | B60N 2/015 244/118.5 |
| 2003/0226934 A1 | 12/2003 | Saint-Jalmes | | |
| 2007/0114819 A1 | 5/2007 | Dougherty | | |
| 2008/0156602 A1 * | 7/2008 | Hiemenz | ............... | B60N 2/4242 188/267.1 |
| 2010/0201172 A1 | 8/2010 | Hudswell et al. | | |
| 2014/0224931 A1 | 8/2014 | Weitzel et al. | | |
| 2014/0319275 A1 * | 10/2014 | Najd | ..................... | B64D 11/02 244/118.6 |

FOREIGN PATENT DOCUMENTS

| | | |
|---|---|---|
| JP | 3106501 U | 10/2004 |
| JP | 2008-510554 A | 4/2008 |
| WO | 2011/018930 A1 | 2/2011 |

OTHER PUBLICATIONS

Chinese Office Action issued in related CN Application No. 201480034805.6 dated Jan. 12, 2017, 10 pages.
Japanese Office Action issued in related JP Application No. 2016-519680 dated Jan. 17, 2017, 5 pages.

* cited by examiner

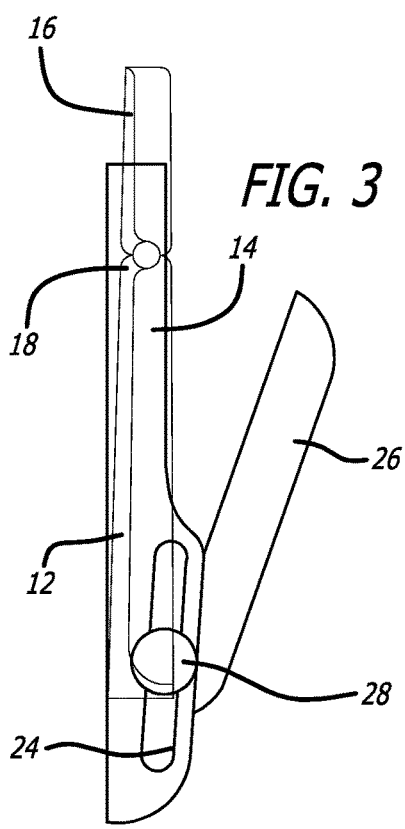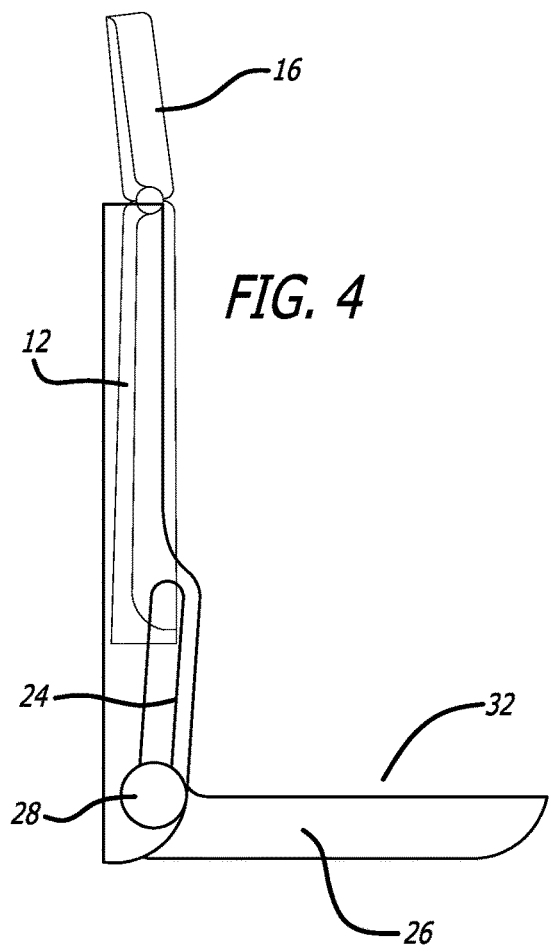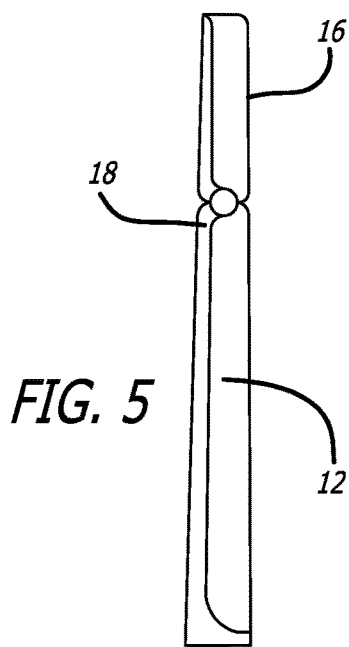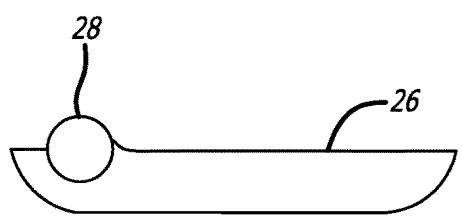

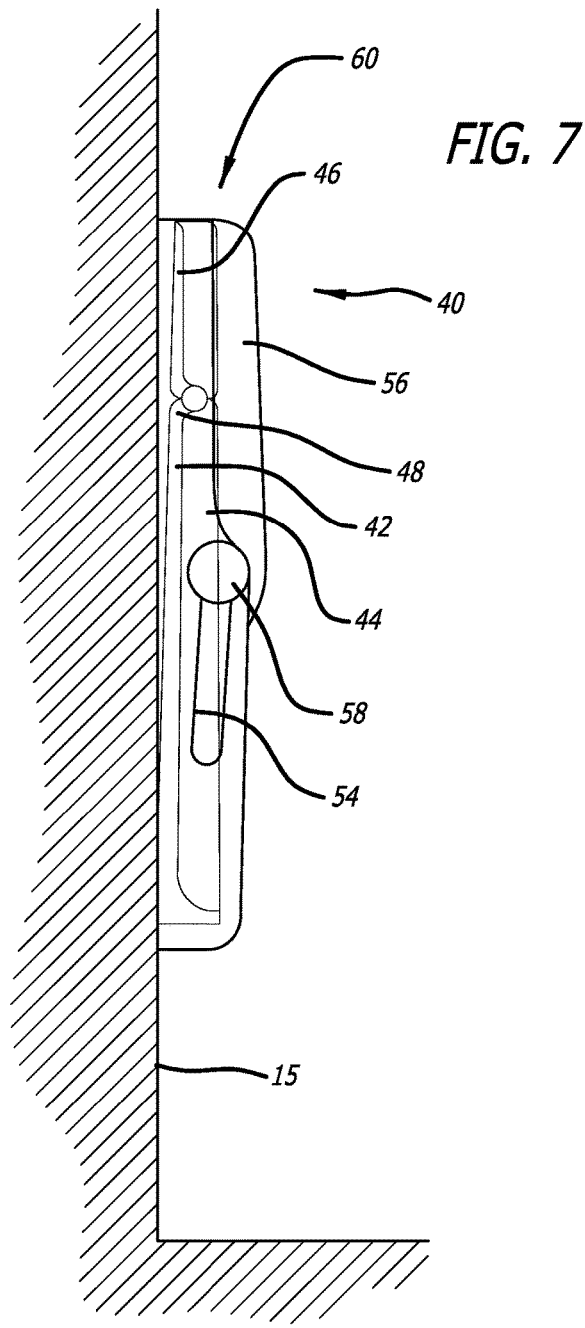
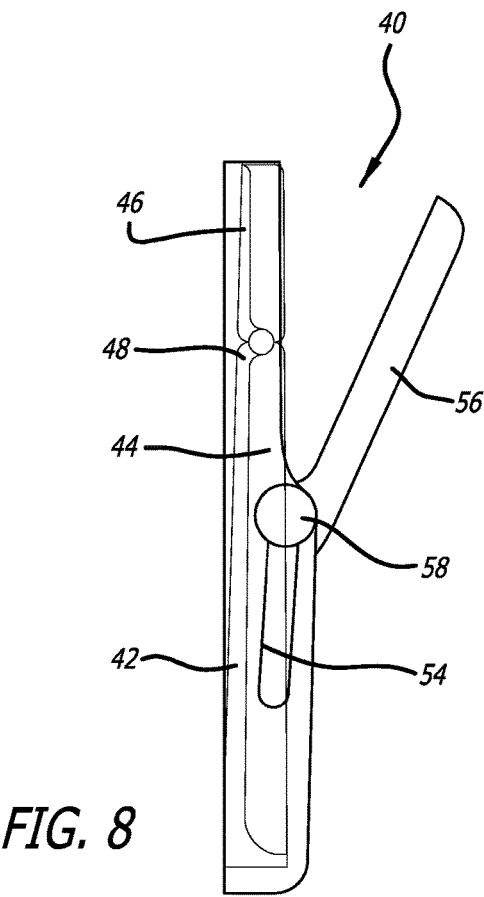
FIG. 7
FIG. 8

COMPACT AIRCRAFT CABIN ATTENDANT SEAT

CROSS-REFERENCES TO RELATED APPLICATIONS

This application is based upon and claims priority from U.S. Provisional Application No. 61/836,304, filed Jun. 18, 2013, incorporated by reference in its entirety.

This invention relates generally to aircraft crew attendant seats, and more particularly relates to a compact aircraft cabin crew attendant seat including carbon fiber reinforced composite as the main structural material to significantly reduce the weight, and in which the primary components and seat cushions of the crew attendant seat are fully enclosed by folding the seat to a closed position. In one presently preferred aspect, the compact aircraft cabin crew attendant seat includes a shock load absorption system in the seat structure.

BACKGROUND

Aircraft crew attendant seats, or jump seats, are commonly provided in cockpits or passenger cabins. Passenger cabin attendant seats are typically used by the passenger cabin flight attendant crew, especially during takeoff and landing, and are typically located near an emergency exit to allow a flight attendant to readily open an exit door if necessary in the event of an emergency. Such passenger cabin crew attendant seats also are commonly designed to be folded when not in use to maintain clear pathways to emergency exits.

One conventional flight attendant's folding seat assembly is known that is mounted to a wall in an aircraft cabin includes a seat pan that can be unfolded and pulled down to an open position against a seat return spring, with cams that are actuated by the seat pan frame that urge the seat back into a downwardly and forwardly sloping seating orientation, and rearward force exerted by a user against the seat back frame is reacted through the cams into the supporting wall, so that the seat pan is not forced to close on the seated occupant. The seat pan frame is provided with a contoured seat cushion that complements contouring of a seat back cushion.

Another conventional seat or chair for an aircraft flight attendant includes a backrest section and a seat section hinged to each other and to a frame allowing the backrest and seat sections to take up different angular positions.

A crashworthy rear-facing aircraft passenger seat is known that includes forward, intermediate and rearward energy absorbers attached between the seat and the floor of the aircraft, and having the capability of operating in both tension and compression, for absorbing energy during a crash. The seat also can flex along with crash-induced distortions of the floor to prevent separation of the seat from the floor during a crash.

It would be desirable to provide a compact aircraft cabin crew attendant seat that utilizes carbon fiber reinforced composite as the main structural material of the crew attendant seat to significantly reduce weight of the crew attendant seat as compared with conventional crew attendant seats. It would also be desirable to provide a compact aircraft cabin crew attendant seat in which a full enclosure of the primary components and seat cushions of the crew attendant seat are formed by a "clam shell" action of folding the seat. It would also be desirable to provide a compact aircraft cabin crew attendant seat that incorporates a shock load absorption system into the seat structure by the utilization of hydraulic and/or friction dampers. It would also be desirable to provide a compact aircraft cabin crew attendant seat that reduces the depth requirement of the crew attendant seat. The present invention meets these and other needs.

SUMMARY OF THE INVENTION

Briefly, and in general terms, the present invention provides for a compact aircraft cabin crew attendant seat, including carbon fiber reinforced composite as a main structural material to significantly reduce the weight. The primary components and seat cushions of the crew attendant seat are fully enclosed by folding the seat to a closed configuration. In one presently preferred aspect, the compact aircraft cabin crew attendant seat includes a shock load absorption system in the seat structure. The compact aircraft cabin crew attendant seat also reduces the depth requirement for a crew attendant seat due to the compactness of the design of the crew attendant seat.

Accordingly, the present invention provides for a compact aircraft cabin crew attendant seat, including a seat back portion, a shell that encloses the seat back portion, a head rest portion mounted to a top portion of the seat back portion, and a seat portion or squab that typically includes a thick, stuffed cushion. The shell is configured to be mounted to a wall of an aircraft, and includes a vertically oriented slot. The seat portion includes a hinge that is slidably attached within the slot, allowing the seat portion to be unfolded to an open configuration of the crew attendant seat for use. In a presently preferred aspect, the seat portion hinge moves vertically between an upper position at the top of the slot in a compact closed position, and a lower position at the bottom of the slot in the open position. In another presently preferred aspect, the seat portion is also biased to be folded up into the compact closed position, such as by a seat return spring, for example. In another presently preferred aspect, the head rest portion is configured to pivot to a limited degree with respect to the seat back portion for user comfort when in use.

In another presently preferred aspect, at least a major portion of the seat back portion, shell, head rest portion and squab are preferably formed from high strength carbon fiber reinforced composite that significantly reduces the weight of the crew attendant seat. In another presently preferred aspect, an attendant seat harness for a user is advantageously connected between a top of the shell or base of the head rest portion and a lower portion of the seat back, such that the lower portion of the harness travels with the seat as the seat travels downward in the slot to the open position. In another presently preferred aspect, the attendant seat harness is self-retracting into the crew attendant seat.

In another presently preferred aspect, a vertical shock absorption system is disposed within a lower portion of the shell and connected to the bottom portion of the seat back, and is configured to absorb energy during a crash landing of the aircraft, and is particularly configured to dissipate vertical loads by the articulation of the seat. The crew attendant seat folds into a compact envelope that encloses the seat cushions improving cleanliness, ergonomics and appearance. In another presently preferred aspect, the crew attendant seat can be self-deploying.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 3 is a side elevational view of the compact aircraft cabin crew attendant seat of FIG. 1 showing an intermediate stage of deployment of the crew attendant seat.

FIG. 4 is a side elevational view of the compact aircraft cabin crew attendant seat of FIG. 1 showing final stage of deployment of the crew attendant seat.

FIG. 5 is a side elevational view the squab of the compact aircraft cabin crew attendant seat of FIG. 1.

FIG. 6 is a side elevational view the seat back portion and head rest portion of the compact aircraft cabin crew attendant seat of FIG. 1.

FIG. 7 is a side elevational view of a second embodiment of the compact aircraft cabin crew attendant seat according to the present invention.

FIG. 8 is a side elevational view of the compact aircraft cabin crew attendant seat of FIG. 7 showing an initial stage of deployment of the crew attendant seat.

DETAILED DESCRIPTION OF THE PREFERRED EMBODIMENTS

Figure 1:
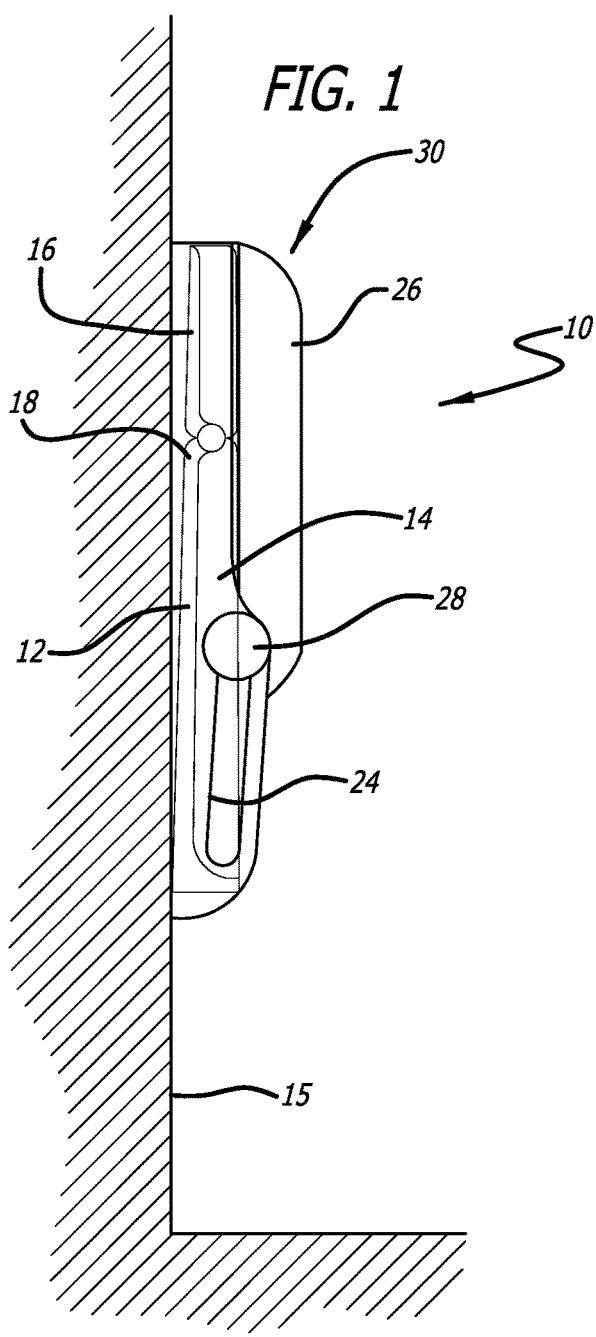
FIG. 1 is a side elevational view of a first embodiment of the compact aircraft cabin crew attendant seat according to the present invention.

Referring to the drawings, which are provided for purposes of illustration and by way of example, in a first presently preferred embodiment illustrated in FIGS. 1-6, the present invention provides for a compact aircraft cabin crew attendant seat 10 that includes a seat back or back rest portion 12, and a frame or shell 14 enclosing the seat back portion, and that is configured to be mounted to a wall 15 of an aircraft. A head rest portion 16 is hingedly mounted to a top portion 18 of the seat back portion, allowing the head rest portion to pivot to a limited degree with respect to the seat back portion for user comfort when in use. The crew attendant seat is movable between a closed configuration, shown in FIG. 5, and an open configuration of the crew attendant seat, shown in FIG. 4. The main structure of the seat, such as at least a major portion of the seat back portion, shell, head rest portion and squab, for example, is preferably formed from high strength carbon fiber reinforced composite that significantly reduces the weight of the crew attendant seat.

Figure 2:
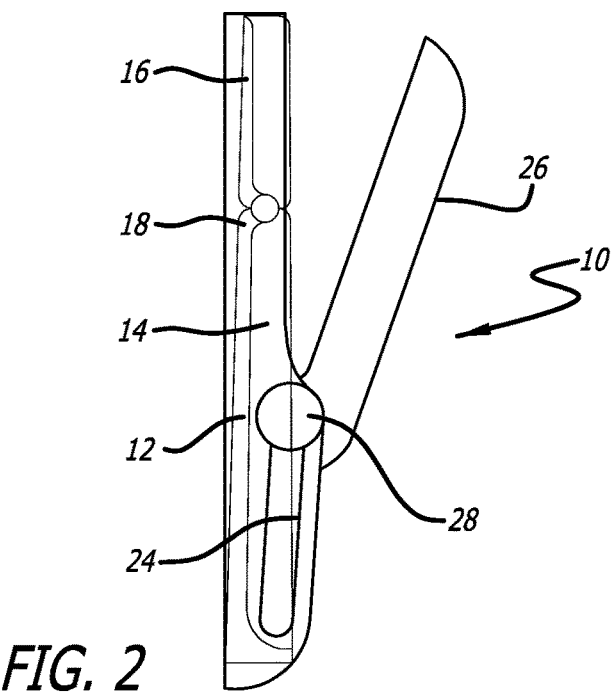
FIG. 2 is a side elevational view of the compact aircraft cabin crew attendant seat of FIG. 1 showing an initial stage of deployment of the crew attendant seat.
Figure 9:
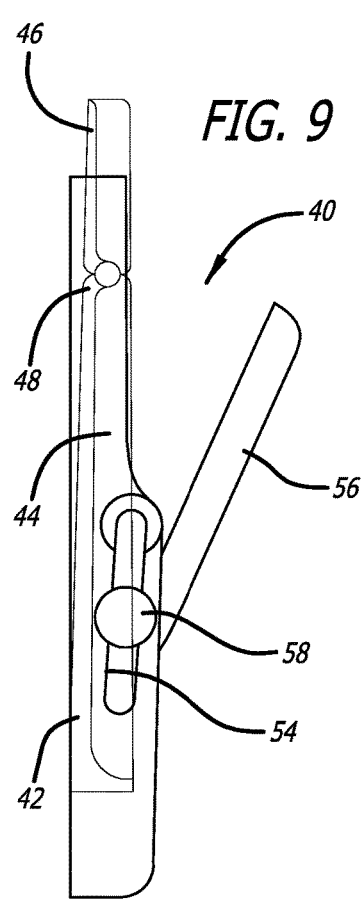
FIG. 9 is a side elevational view of the compact aircraft cabin crew attendant seat of FIG. 7 showing an intermediate stage of deployment of the crew attendant seat.
Figure 10:
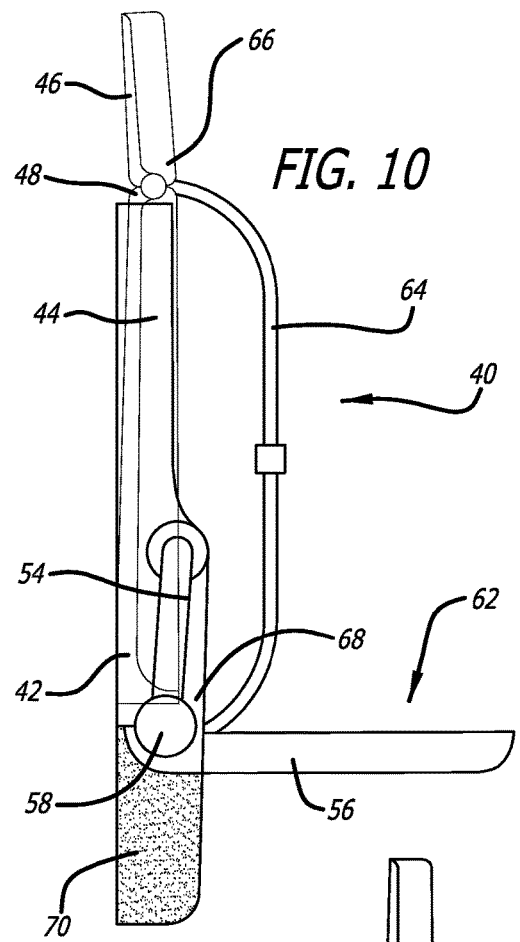
FIG. 10 is a side elevational view of the compact aircraft cabin crew attendant seat of FIG. 7 showing final stage of deployment of the crew attendant seat.
Figure 11:
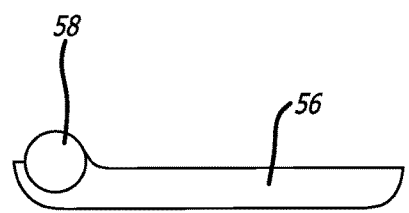
FIG. 11 is a side elevational view the squab of the compact aircraft cabin crew attendant seat of FIG. 7.
Figure 12:
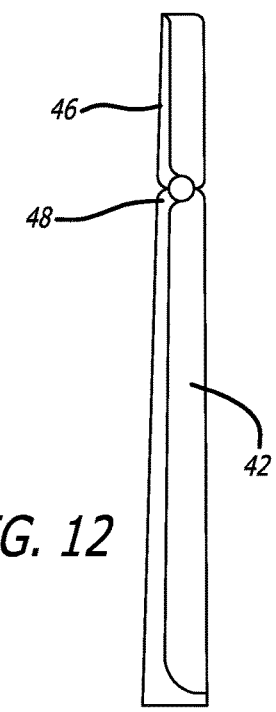
FIG. 12 is a side elevational view the seat back portion and head rest portion of the compact aircraft cabin crew attendant seat of FIG. 7.

The frame or shell includes a slot 24 to which a seat portion or squab 26, typically including a thick, stuffed cushion, is mounted. The mounting of the seat portion or squab preferably includes a hinge 28 slidably attached within the slot, and a seat return spring (not shown) allowing the seat portion or squab to be folded down in the open position of the crew attendant seat for use, and biasing the seat portion or squab to be folded up into the compact closed position. The seat portion or squab hinge preferably moves vertically between an upper folded position 30 at the top of the slot in the compact closed position, shown in FIG. 1, and a lower unfolded, extended position 32 at the bottom of the slot in the open position. The crew attendant seat folds into a compact envelope in the closed configuration that encloses the seat cushions improving cleanliness, ergonomics and appearance, is preferably self-deploying. As is illustrated in FIGS. 2-4, as the squab is folded down and descends in the slot for the open configuration, the seat back portion and head rest portion are configured to move upwardly together with respect to the shell and the squab, to extend the head rest portion for use by a user. Conversely, when the squab is folded up and ascends in the slot, the crew attendant seat folds into the closed configuration.

In a second presently preferred embodiment illustrated in FIGS. 7-12, a compact aircraft cabin crew attendant seat 40 includes a seat back or back rest portion 42 and a frame or shell 44 enclosing the seat back portion, and configured to be mounted to a wall of an aircraft. A head rest portion 46 is hingedly mounted to a top portion 48 of the seat back portion, allowing the head rest portion to pivot to a limited degree with respect to the seat back portion for user comfort when in use. The crew attendant seat is movable between a closed configuration, shown in FIG. 7, and an open configuration, shown in FIG. 10. The main structure of the seat, such as at least a major portion of the seat back portion, shell, head rest portion and squab, for example, is preferably formed from high strength carbon fiber reinforced composite that significantly reduces its weight.

The frame or shell includes a slot 54 to which a seat portion or squab 56 is mounted. The mounting of the seat portion or squab preferably includes a hinge 58 that is slidably attached within the slot, and a seat return spring (not shown) allowing the seat portion or squab to be folded down in the open position of the crew attendant seat for use, and biasing the seat portion or squab to be folded up into the compact closed position. The seat portion or squab hinge preferably moves vertically between an upper position 60 at the top of the slot in the compact closed position, shown in FIG. 7, and a lower position 62 at the bottom of the slot in the open configuration. As the squab is folded down and descends in the slot for the open configuration, the seat back portion and head rest portion are configured to move upwardly together with respect to the shell and the squab, to extend the head rest portion for use by a user. Conversely, when the squab is folded up and ascends in the slot, the crew attendant seat folds into the closed configuration.

An attendant seat harness or restraint system 64 for a user also is advantageously connected between a lower portion 68 of the shell, or a rear portion of the squab, and the base 66 of the head rest portion and/or the top of the back rest portion, so that the lower portion of the harness travels with the seat as the seat travels downward in the slot to the open position. The attendant seat harness is self-retracting into the crew attendant seat structure.

A vertical shock absorption system 70, including hydraulic and/or friction dampers, for example, is also provided within a lower portion of the frame or shell, and preferably is connected to the seat portion and the bottom portion of the seat back or back rest portion to absorb energy and shock during a crash landing of the aircraft, and in particular preferably allows vertical loads to be dissipated by the articulation of the seat. The crew attendant seat folds into a compact envelope that encloses the seat cushions improving cleanliness, ergonomics and appearance. In another presently preferred aspect, the crew attendant seat preferably can be configured to be self-deploying.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A compact cabin crew attendant seat for an aircraft, comprising:
   a seat back portion;
   a frame assembly including a shell enclosing the seat back portion and a vertically oriented slot having a top and a bottom;
   a head rest portion mounted to a top portion of the seat back portion;
   a seat portion including a hinge slidably attached within the vertically oriented slot, said seat portion being configured to be moved between a folded closed position and an unfolded open position, said hinge being configured to move vertically between an upper position at the top of the slot in the folded closed position, and a lower position at the bottom of the slot in the unfolded open position, wherein,
   responsive to the seat portion being moved from the folded closed position to the unfolded open position, the seat back extends vertically upward relative to the shell, and
   responsive to the seat portion being moved from the unfolded open position to the folded closed position, the seat back retracts vertically downward relative to the shell; and,
   a vertical shock absorption system fully enclosed within the frame assembly, said vertical shock absorption system being configured to absorb energy during a crash landing of the aircraft.

2. The compact aircraft cabin crew attendant seat of claim 1, wherein said frame assembly is configured to be mounted to a wall of the aircraft.

3. The compact aircraft cabin crew attendant seat of claim 1, wherein said head rest portion is configured to pivot to a limited degree with respect to the seat back portion.

4. The compact aircraft cabin crew attendant seat of claim 1, wherein a major portion of the seat back portion, shell, head rest portion and seat portion are formed from high strength carbon fiber reinforced composite.

5. The compact aircraft cabin crew attendant seat of claim 1, further comprising an attendant seat harness connected between a lower portion of the shell and a base of the head rest portion.

6. The compact aircraft cabin crew attendant seat of claim 1, wherein said vertical shock absorption system is configured to dissipate vertical loads by articulation of the seat portion.

7. The compact aircraft cabin crew attendant seat of claim 1, wherein the vertical shock absorption system is connected to the seat portion and a bottom portion of the seat back portion.

8. The compact aircraft cabin crew attendant seat of claim 1, wherein, in the unfolded, open position, the head rest portion extends at least partially above the shell.

9. A compact aircraft cabin crew attendant seat for an aircraft, comprising:
   a seat back portion;
   a frame assembly including a shell enclosing the seat back portion, and a vertically oriented slot having a top and a bottom;
   a head rest portion mounted to a top portion of the seat back portion;
   an attendant seat harness connected between a lower portion of the frame assembly and a base of the head rest portion;
   a seat portion including a hinge slidably attached within the vertically oriented slot, said seat portion being configured to be moved between a folded closed position and an unfolded open position, said hinge being configured to move vertically between an upper position at the top of the slot in the folded closed position, and a lower position at the bottom of the slot in the unfolded open position, wherein,
   responsive to the seat portion being moved from the folded closed position to the unfolded open position, the seat back extends vertically upward relative to the shell, and
   responsive to the seat portion being moved from the unfolded open position to the folded closed position, the seat back retracts vertically downward relative to the shell; and
   a vertical shock absorption system connected to the seat portion and a bottom portion of the seat back portion, said vertical shock absorption system being configured to absorb energy during a crash landing of the aircraft.

10. The compact aircraft cabin crew attendant seat of claim 9, wherein said frame assembly is configured to be mounted to a wall of the aircraft.

11. The compact aircraft cabin crew attendant seat of claim 9, wherein said head rest portion is configured to pivot to a limited degree with respect to the seat back portion.

12. The compact aircraft cabin crew attendant seat of claim 9, wherein a major portion of the seat back portion, shell, head rest portion and seat portion are formed from high strength carbon fiber reinforced composite.

13. The compact aircraft cabin crew attendant seat of claim 9, wherein said vertical shock absorption system is configured to dissipate vertical loads by articulation of the seat portion.

14. The compact aircraft cabin crew attendant seat of claim 9, wherein the vertical shock absorption system is fully enclosed within a lower portion of the shell.

15. The compact aircraft cabin crew attendant seat of claim 9, wherein the attendant seat harness is connected between a lower portion of the shell and a base of the head rest portion.

16. A compact aircraft cabin crew attendant seat for an aircraft, comprising:
   a seat back portion;
   a frame assembly including a shell enclosing the seat back portion, and a vertically oriented slot having a top and a bottom;
   a head rest portion mounted to a top portion of the seat back portion;
   an attendant seat harness connected between a lower portion of the frame assembly and a base of the head rest portion;
   a seat portion including a hinge slidably attached within the vertically oriented slot, said seat portion being configured to be moved between a folded closed position and an unfolded open position, said hinge being configured to move vertically between an upper position at the top of the slot in the folded closed position, and a lower position at the bottom of the slot in the unfolded open position, wherein responsive to the seat portion being moved from the folded closed position to the unfolded open position, the seat back extends vertically upward relative to the shell, and responsive to the seat portion being moved from the unfolded open position to the folded closed position, the seat back retracts vertically downward relative to the shell.

17. The compact aircraft cabin crew attendant seat of claim 16, wherein said head rest portion is configured to pivot to a limited degree with respect to the seat back portion.

18. The compact aircraft cabin crew attendant seat of claim 16, further comprising a vertical shock absorption system connected to the seat portion and a bottom portion of the seat back portion, said vertical shock absorption system being configured to absorb energy during a crash landing of the aircraft by dissipating vertical loads.

19. The compact aircraft cabin crew attendant seat of claim 18, wherein the vertical shock absorption system is fully enclosed within a lower portion of the shell.

20. The compact aircraft cabin crew attendant seat of claim 7, wherein the vertical shock absorption system allows vertical loads to be dissipated through articulation of the seat portion.

* * * * *